Oct. 21, 1941.　　A. J. BAILIE　　2,259,987
CHILD'S VEHICLE
Filed Dec. 26, 1940　　2 Sheets-Sheet 1
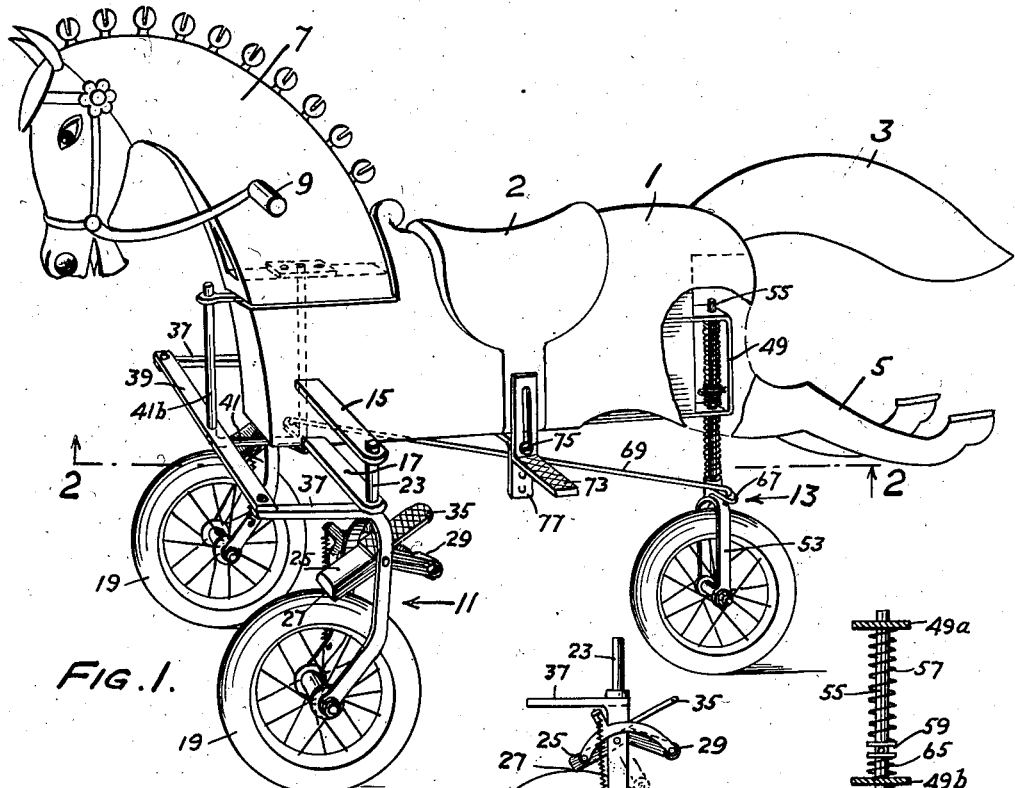
FIG. 1.
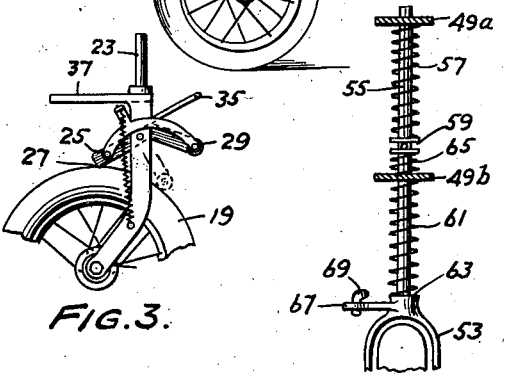
FIG. 3.
FIG. 8.
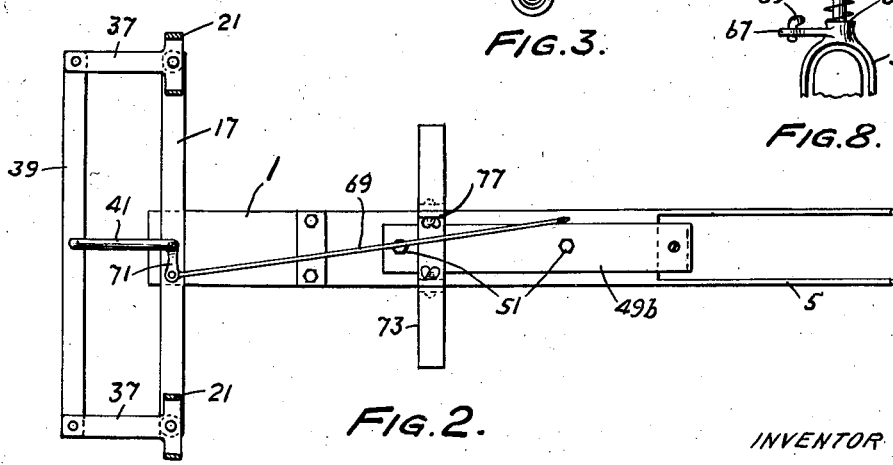
FIG. 2.
WITNESS:
INVENTOR
Alfred J. Bailie
BY
ATTORNEYS.

Oct. 21, 1941.  A. J. BAILIE  2,259,987
CHILD'S VEHICLE
Filed Dec. 26, 1940  2 Sheets-Sheet 2
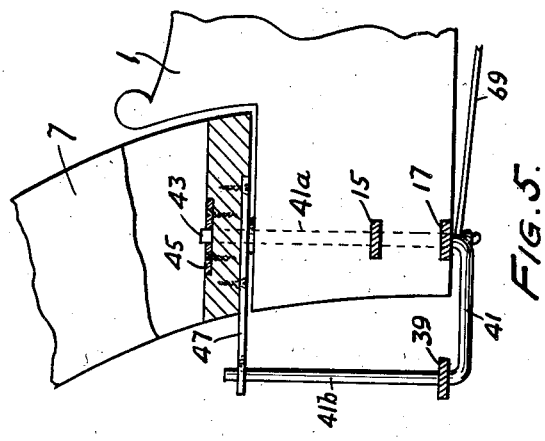
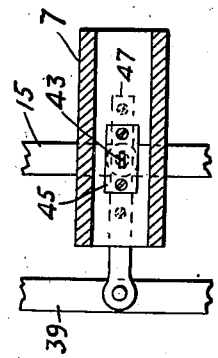
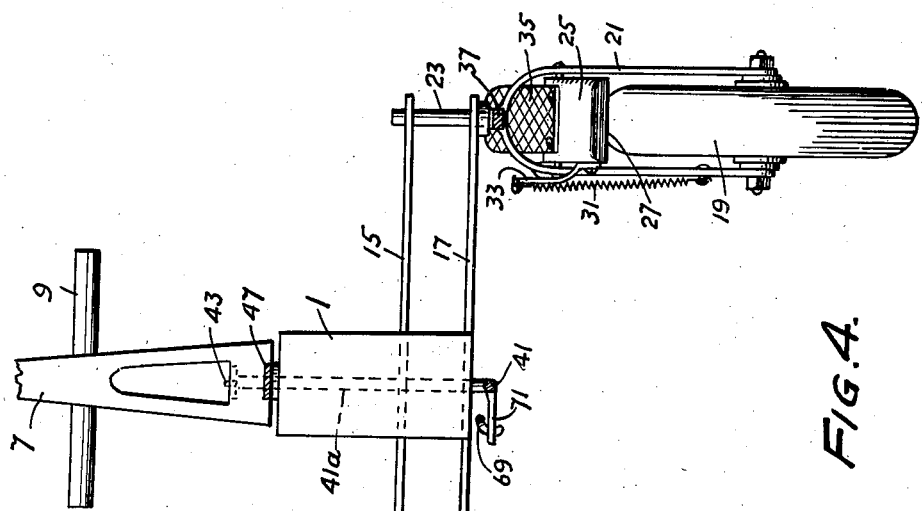
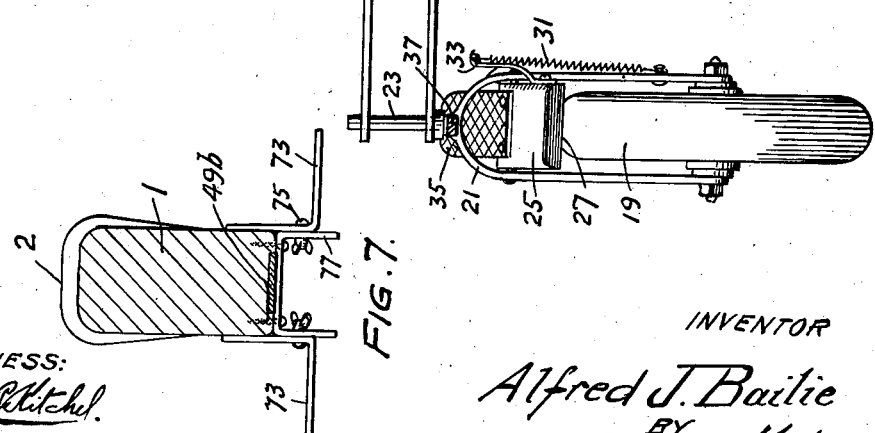
INVENTOR
Alfred J. Bailie
BY
Busser & Harding
ATTORNEYS.

Patented Oct. 21, 1941

2,259,987

UNITED STATES PATENT OFFICE 2,259,987

CHILD'S VEHICLE

Alfred J. Bailie, Wyndmoor, Pa.

Application December 26, 1940, Serial No. 371,701

6 Claims. (Cl. 280—1.19)

This invention relates to an improvement in a child's vehicle, more particularly a hobby-horse velocipede or tricycle.

It is an object of this invention to provide a child's vehicle simulating a hobby-horse that may be propelled by the imparting thereto by the child of a rocking, bouncing or posting motion.

It is a further object of this invention to provide a vehicle of this character in which the mechanism can be easily shifted by the operator to permit free coasting or movement in either direction.

A further object is to provide an improved steering mechanism which will permit very sharp turns to be made.

The present invention contemplates a body, which preferably will be shaped to simulate an animal, as a horse, rigidly supported at its forward end on a pair of wheels, and yieldingly supported at its rearward end on a single wheel. The steering mechanism will preferably include the pivotally mounted head of the animal as the controlling means thereof; and means for preventing, when desired, rearward motion of the device are contemplated.

In the drawings, which illustrate a preferred embodiment of the invention:

Figure 1 is a perspective view of a hobby-horse vehicle in accordance with the present invention;

Figure 2 is a section on the line 2—2 in Fig. 1, looking upward;

Figure 3 is a detail view of the ratchet and braking mechanism;

Figure 4 is a detail view of the front wheel supporting and steering assembly;

Figure 5 is a detail view of a portion of the steering assembly;

Figure 6 is a further detail view of a portion of the steering assembly;

Figure 7 is a detail view showing the adjustable foot supports; and

Figure 8 is a detail view showing the spring suspension of the rear wheel assembly.

As shown in Figure 1 the vehicle comprises a body portion 1, simulating that of a horse, including a saddle 2, a tail 3 and rear legs 5; a head portion 7, including steering handles 9; two front wheel assemblies 11; and a rear wheel assembly 13.

The forward portion of the body 1 is supported on two spaced-apart transverse bars 15, 17, in the outer ends of which the front wheel assemblies 11 are pivotally mounted. Each front wheel assembly includes a conventional pneumatic tired, wire wheel unit, 19, mounted on ball or roller bearings within the fork 21, the post 23 of which, as indicated, extends through apertures in the outer ends of bars 15, 17. Cotter pins (not shown) may conveniently be used to secure the assembly in position.

As shown in Figs. 1, 3 and 4, a combined ratchet or clutch and brake member 25 is pivotally mounted in each of the forks 21 above the wheels 19. Each member 25 is provided forwardly with a relatively sharp edge 27 adapted to engage the tire on wheel 19 at an acute angle, as shown in full lines in Fig. 3, so as to prevent rearward rotation thereof, while permitting forward rotation. At the rearward end of each member 25 is positioned a roller 29, also adapted to be brought into contact with the tire on wheel 19 when desired, as shown in dotted lines in Fig. 3. A spring 31, secured between arm 33 of the member 25 and the wheel axle, tends to hold the member in either of the two positions described; while the member may be moved from one position to another, against the action of spring 31, by means of pedal 35 secured thereto.

Steering of the front wheels is accomplished through steering arms 37, secured to forks 21, steering cross-bar 39, and the U-shaped member 41. As shown in Fig. 5, member 41 is pivotally secured in the forward portion of the body 1, one arm, 41a, thereof passing through central apertures in bars 15 and 17. The upper end of the arm 41a supports and is rigidly secured in the head 7, which is thus pivotally mounted on the body 1. The engagement of the head 7 and arm 41a, as shown in Fig. 6, is accomplished by the positioning of a flattened extension 43 of arm 41a within a rectangular slot in plate 45 secured in the head 7. The other arm, 41b, of member 41 passes through an aperture in cross-bar 39, and, at its upper end, through an aperture in arm 47, which is rigidly secured to the head 7. Turning movements of head 7, by means of handles 9, are thus transmitted to the front wheels 19.

As shown in Figs. 1 and 8, the rear wheel assembly 13 is mounted in a U-frame member 49 secured to the body 1 by bolts 51 (Fig. 2). The fork 53 in which the wheel is mounted is provided with a post 55 extending through aligned apertures in the two sides of the member 49. A spring 57 extends about post 55 between the upper side, 49a, of member 49 and a collar 59 on post 55, and a second similar spring 61 extends between the lower side, 49b, of member 49 and the shoulder 63. A small spring 65, to absorb recoil, is positioned between 49b and the collar 59.

A steering arm 67 secured to rear fork 53 is connected by rod 69 with an extension 71 secured to the base of steering member 41. Rod 69 is crossed so that the rear wheel will be turned in a direction opposite to that of the front wheels, thus facilitating the making of sharp turns.

A pair of foot-rests 73 are adjustably secured to the body 1 beneath saddle 2 by means of bolts 75 which engage the support 77.

In use the rider will propel the device in a forward direction by placing the members 25 in the position shown in the solid lines in Fig. 3, and rocking to and fro on the body 1. As the rider's weight is thrown downwardly and back, the springs 57, 61 are compressed, and the rear end of the body rocks downwardly about the front wheel axles as a pivot. This produces a relative rotation of the body, including members 25, about the front wheels which, as they are in contact with the floor, do not move. On the succeeding upward and forward movement of the rider, the springs 57, 61 expand, lifting the body, and by engagement of the edge 27 of member 25 with the wheel, rotating the wheel in respect to the floor, thus moving the device forward. Also, of course, the forward movement of the rider's body is transferred to the vehicle, moving it forward by momentum.

As the member 25, in the position described, prevents any rearward movement of the vehicle on the rearward movement of the rider's body, the repeated rocking of the rider will cause the device to proceed forwardly at a good rate.

If the rider desires to exercise, coast, or to move the device rearwardly, members 25 will be moved, by stepping on pedals 35, to the position shown in dotted lines in Fig. 3. Continued pressure on pedals 35 will exert a braking action by pressing the rollers 29 more tightly against the tires.

It will be appreciated that the foregoing details of construction and operation are given by way of illustration only, and that my invention is in no way limited thereto, since such details can be varied widely without departing from the scope of my invention, as defined in the claims hereinafter set forth.

What I claim and desire to protect by Letters Patent is:

1. In a child's vehicle adapted to be propelled by the imparting thereto of a rocking or bouncing motion, the combination of a body, a pair of front wheels rigidly supporting the forward end of said body, a rear wheel for supporting the rear end of said body, means yieldingly connecting said rear wheel and said body in such manner as to permit substantially only vertical relative movement of said wheel axle and body, and means adapted to prevent rearward rotation of said front wheels while permitting forward rotation thereof.

2. In a child's vehicle adapted to be propelled by the imparting thereto of a rocking or bouncing motion, the combination of a body simulating that of an animal and adapted to carry a child astride, a pair of front wheels rigidly supporting the forward end of said body, a rear wheel for supporting the rear end of said body, means yieldingly connecting said rear wheel and said body in such manner as to permit substantially only vertical relative movement of said wheel axle and body, and means adapted to prevent rearward rotation of said front wheels while permitting forward rotation thereof.

3. In a child's vehicle adapted to be propelled by the imparting thereto of a rocking or bouncing motion, the combination of a body simulating that of an animal and adapted to carry a child astride, a pair of front wheels rigidly supporting the forward end of said body, a rear wheel for supporting the rear end of said body, means yieldingly connecting said rear wheel and said body in such manner as to permit substantially only vertical relative movement of said wheel axle and body, means adapted to prevent rearward rotation of said front wheels while permitting forward rotation thereof, and means for steering said front wheels, said steering means including a member simulating the head of the animal pivotally mounted on said body and serving as the steering control.

4. In a child's vehicle adapted to be propelled by the imparting thereto of a rocking or bouncing motion, the combination of a body, a pair of front wheels rigidly supporting the forward end of said body, a rear wheel for supporting the rear end of said body, means yieldingly connecting said rear wheel and said body in such manner as to permit substantially only vertical relative movement of said wheel axle and body, and means adapted to prevent rearward rotation of said front wheels while permitting forward rotation thereof, said last named means being also adapted to be moved by the rider from operative into an inoperative position.

5. In a child's vehicle adapted to be propelled by the imparting thereto of a rocking or bouncing motion, the combination of a body, a pair of front wheels supporting the forward end of said body, a rear wheel yieldingly supporting the rear end of said body, and means associated with said front wheels and capable of being shifted by the rider into one or another of two positions, in one of which it acts to prevent rearward rotation of said front wheels while permitting forward rotation thereof, and in the other of which it is capable of exerting a braking action on said front wheels.

6. In a child's vehicle adapted to be propelled by the imparting thereto of a rocking or bouncing motion, the combination of a body, a pair of front wheels supporting the forward end of said body, a rear wheel yieldingly supporting the rear end of said body, means adapted to prevent rearward rotation of said front wheels while permitting forward rotation thereof, and a single means for steering said front wheels and said rear wheel.

ALFRED J. BAILIE.